(No Model.)
F. H. BULTMANN.
COMBINED DRILL AND REAMER.
No. 253,263.                                    Patented Feb. 7, 1882.
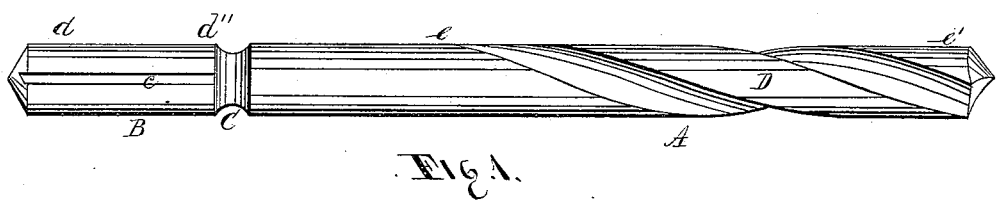
Fig. 1.
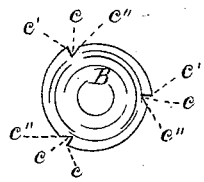   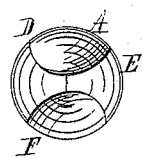
Fig. 2.         Fig. 3.
Witnesses.                              Inventor.
Oral A. Webster                         F. H. Bultmann
J. H. Burridge                          W. H. Burridge
                                           Atty.

UNITED STATES PATENT OFFICE.

FREDERICK H. BULTMANN, OF CLEVELAND, OHIO.

COMBINED DRILL AND REAMER.

SPECIFICATION forming part of Letters Patent No. 253,263, dated February 7, 1882.

Application filed September 29, 1881. (No model.)

*To all whom it may concern:*

Be it known that I, FREDERICK H. BULTMANN, of Cleveland, Cuyahoga county, and State of Ohio, have invented a certain Improved Tool, being a Drill and Reamer Combined, of which the following is a specification.

My improvement relates to that class of tools known as "twist-drills;" and it consists in making a drill at one end and a reamer and holder at the other. The reamer or mill may or may not have special reference to the size of the drill to ream out the hole more or less after it has been made by the drill connected with the reamer. The reamer is formed with longitudinal grooves, which are designed as cutting-edges a portion of their length, and the uncutting-edge portion or sides of the grooves are designed to rest against the clutches of the chuck in holding the tool for drilling, which will effectually prevent the chuck from turning without the drill when held in the said clutches.

In the ordinary way of making twist-drills the shanks are left round and smooth, and when it is clamped in the chuck for drilling the frictional resistance of the drill in making the hole is often so great as to cause the clamps of the chuck to slip or turn on the smooth shank, leaving the drill stationary, which arrests the work and causes a cutting and grooving of the surfaces of the shank and clutches in contaction, causing material injury to the tools. To avoid these difficulties is one object of my improvement.

The drill-section of the tool may be so constructed or twisted as to present the twist between the grooves to the clamps of the chuck without injury to the drill, which will cause it to run true when the article is used for reaming. The form of the twist will prevent the chuck from slipping or turning when the tool is used as a reamer or mill.

For a more detailed description of the said tool reference will be had to the following specification and to the annexed drawings, making part of the same.

Figure 1 is a view of the drill, reamer, and holder combined; Fig. 2, a view in cross-section of the mill and holder part of the tool, and Fig. 3 is the end view of the drill.

Like letters denote like parts in the drawings.

The twist or drill part of the tool is seen at A, Fig. 1, and the reamer and holder section is shown at B, there being a neck, C, between and connecting the two parts together. The reamer part is provided with three longitudinal grooves, $c$, which may be more or less in number. These grooves are so formed as to present a cutting-edge from the outer end of the reamer to about one-third of the length back to the neck C, more or less, and the reamer gradually and slightly is reduced in diameter from the point or end to the said neck. The face of the reamer or mill is a little depressed or curved down from the cutting-edge at $c'$ back to the base of the groove at $c''$—that is, the face of the reamer slightly recedes from the cutting-edge back to the base of the next groove, as indicated in Fig. 2. The object of this is to present as little frictional surface as may be in contact with the side of the hole while being reamed out, and as the reamer from $d$ to $d'$, Fig. 1, decreases slightly in diameter the tool will readily free itself in working. The drill A is also made with its diameter less at $e$ than at the lip or point $e'$. The reduction is gradual from $e'$ to $e$, which allows the chips and drill to be freed from the hole.

In using the tool as a reamer or mill the clamps of the chuck will be caused to clasp the drill at the points D E F, Fig. 3, between the spiral grooves and the shoulders or edges of the twist on the sides of the said grooves, which will prevent the chuck from slipping or turning on the drill, and as the drill is slightly depressed back from the cutting-edge, it follows that the clamps will more tightly hold the drill, as the clamps may be forced down on the said depressed part of the drill, and the tendency is then to tighten the clamps and prevent the turning or slipping of the chuck upon the tool when in use, and will also cause it to run true.

If preferred, the reamer and holder may be made without respective relation to the size of the drill; but it may be preferable to make the reamer or mill to follow the hole made by the drill. The reamer and drill will then have a relative connection and relation.

I am aware that drills and reamers have been known and used as separate and distinct tools; but what distinguishes my improvement from others is the described tool consisting of a drill, reamer, and holder combined, by which there is embraced in one article all the elements and utility of two without the cost and labor of making two separate articles; and my improvement has the additional advantage of having the two tools in one immediately at hand, for facilitating work; and, further, by means of the grooves c a duplex function is attained—that of so holding the drill in the clamps of the chuck as to effectually prevent the said chuck from slipping on the drill-shank when carrying it, which shank forms by my improvement a reamer and drill-holder, as hereinbefore set forth.

What I claim as my improvement, and desire to secure by Letters Patent, is—

The herein-described tool, consisting of a drill and reamer combined, constructed and arranged substantially as and for the purposes set forth.

In testimony whereof I affix my signature in presence of two witnesses.

FREDERICK H. BULTMANN.

Witnesses:
J. H. BURRIDGE,
M. CLIFFORD.